(12) United States Patent
Brohede

(10) Patent No.: US 9,354,028 B2
(45) Date of Patent: May 31, 2016

(54) METHOD AND GNC SYSTEM FOR DETERMINATION OF ROLL ANGLE

(75) Inventor: Daniel Brohede, Karlstad (SE)

(73) Assignee: BAE Systems Bofors AB, Karlskoga (SE)

( * ) Notice: Subject to any disclaimer, the term of this patent is extended or adjusted under 35 U.S.C. 154(b) by 98 days.

(21) Appl. No.: 14/345,791

(22) PCT Filed: Sep. 13, 2012

(86) PCT No.: PCT/SE2012/000135
§ 371 (c)(1),
(2), (4) Date: May 21, 2014

(87) PCT Pub. No.: WO2013/043097
PCT Pub. Date: Mar. 28, 2013

(65) Prior Publication Data
US 2014/0306055 A1 Oct. 16, 2014

(30) Foreign Application Priority Data

Sep. 20, 2011 (SE) ..................... 1130087

(51) Int. Cl.
*F41G 7/20* (2006.01)
*F41G 7/30* (2006.01)
(Continued)

(52) U.S. Cl.
CPC ............... *F42B 15/01* (2013.01); *F41G 7/305* (2013.01); *G01C 21/165* (2013.01); *G05D 1/108* (2013.01)

(58) Field of Classification Search
CPC .......... F42B 15/01; F42B 12/02; F42B 12/20; F42B 12/208; G01C 21/10; G01C 21/12; G01C 21/16; G01C 21/165; G01C 21/20; G05D 1/10; G05D 1/107; G05D 1/108; B60G 17/015; B60G 17/108; B60G 17/0182; B60R 21/01; B60R 21/013; B60R 21/0132; F41G 5/14; F41G 5/16; F41G 7/20; F41G 7/22; F41G 7/222; F41G 7/34; F41G 7/343; F41G 7/346; F41G 7/30; F41G 7/301; F41G 7/305; G01S 5/0009; G01S 5/0018; G01S 19/38; G01S 19/39; G01S 19/40; G01S 19/41; G01S 19/42; G01S 19/45; G01S 19/47

USPC ............ 342/61, 62, 350, 352, 357.2, 357.21, 342/357.22, 357.36, 357.37, 357.38; 244/3.1–3.3; 701/1, 23, 25, 26, 36, 45, 701/46, 400, 408, 500, 502; 73/178 R; 702/85, 94, 127, 150, 151

See application file for complete search history.

(56) References Cited

U.S. PATENT DOCUMENTS 4,265,111 A * 5/1981 Teiling ..................... F41G 5/16
73/178 R
4,831,544 A * 5/1989 Hojo ...................... G01C 21/16
244/3.2

(Continued)

OTHER PUBLICATIONS

International Search Report and Written Opinion issued in corresponding Application No. PCT/SE2012/000135 dated Jan. 11, 2013.

(Continued)

*Primary Examiner* — Bernarr Gregory
(74) *Attorney, Agent, or Firm* — Polsinelli PC

(57) ABSTRACT

The invention relates to a method for determining the roll angle of a guidable and substantially or partially roll-stable projectile comprising control system, radio-based positioning receiver and sensor for measuring roll angular velocity, in which the following steps are included: actuation of the actuators of the projectile by the control system, included in the projectile, for maneuvering of the projectile; estimation of a first signal, the projectile control force, on the basis of the control system included in the projectile; measurement of a second signal, the velocity of the projectile relative to the ground-fixed coordinate system, with the radio-based positioning receiver mounted in the projectile; measurement of a third signal, the rotational velocity, with the sensor for roll angular velocity mounted in the projectile; calculation of a roll angle on the basis of the first, second and third signals, estimated projectile control force, measured projectile velocity, and measured rotational velocity, by summation of the absolute angle change with weighting of an angle evaluation. The invention additionally relates to a GNC system for a guidable projectile comprising control system, radio-based positioning system, and a sensor for measuring roll angular velocity.

26 Claims, 2 Drawing Sheets

(51) Int. Cl.
   *F42B 15/01*   (2006.01)
   *G01C 21/16*   (2006.01)
   *G05D 1/10*    (2006.01)
   *F41G 7/00*    (2006.01)
   *F42B 15/00*   (2006.01)

(56) References Cited

U.S. PATENT DOCUMENTS

| | | | |
|---|---|---|---|
| 5,406,489 A | 4/1995 | Timothy et al. | |
| 5,442,560 A * | 8/1995 | Kau | G01C 21/16 701/502 |
| 5,740,986 A * | 4/1998 | Seidensticker | F41G 7/343 244/3.15 |
| 6,163,021 A | 12/2000 | Mickelson | |
| 6,556,896 B1 * | 4/2003 | Meyer | F42B 15/01 244/3.1 |
| 6,573,486 B1 * | 6/2003 | Ratkovic | F41G 7/346 244/3.15 |
| 6,592,070 B1 * | 7/2003 | Doty | F42B 15/01 244/3.1 |
| 6,779,752 B1 | 8/2004 | Ratkovic | |
| 6,820,025 B2 * | 11/2004 | Bachmann | G01C 21/16 702/94 |
| 6,827,172 B2 * | 12/2004 | Ide | B60R 21/0132 701/46 |
| 6,883,747 B2 * | 4/2005 | Ratkovic | F41G 7/346 244/3.1 |
| 6,889,934 B1 * | 5/2005 | Thomas | F41G 7/222 244/3.15 |
| 7,328,104 B2 * | 2/2008 | Overstreet | G01S 19/47 244/3.2 |
| 7,355,549 B2 * | 4/2008 | Fukuda | G01S 19/41 342/357.38 |
| 7,388,538 B1 * | 6/2008 | Thompson, III | G01S 5/0018 342/357.36 |
| 7,566,027 B1 * | 7/2009 | Johnson | F42B 12/208 244/3.1 |
| 7,908,113 B2 * | 3/2011 | Lonn | F42B 15/01 702/151 |
| 8,344,303 B2 * | 1/2013 | Elgersma | G01C 21/165 244/3.1 |
| 8,457,832 B2 * | 6/2013 | Ono | B60G 17/0182 701/26 |
| 8,779,971 B2 * | 7/2014 | Wellington | G01C 21/20 342/357.36 |
| 2007/0040737 A1 | 2/2007 | Fukuda et al. | |
| 2007/0239394 A1 | 10/2007 | Lonn | |
| 2011/0061456 A1 | 3/2011 | Tyree | |

OTHER PUBLICATIONS

Supplementary European Search Report and European Search Opinion issued Apr. 25, 2015 in EP 12833569.

* cited by examiner

METHOD AND GNC SYSTEM FOR DETERMINATION OF ROLL ANGLE

CROSS REFERENCE TO RELATED APPLICATIONS

This application is a National Phase filing under 35 U.S.C. §371 of PCT/SE2012/000135 filed on Sep. 13, 2012; and this application claims priority to Application No. 1130087-8 filed in Sweden on Sep. 20, 2011; the entire contents of all are hereby incorporated by reference.

TECHNICAL FIELD

The present invention relates to a method for determining and calculating the roll angle for a projectile provided with a radio-based positioning system, a navigation system and a sensor for determining roll angular velocity. The invention additionally constitutes a GNC system for a projectile provided with a radio-based positioning system, a navigation system and a sensor for determining roll angular velocity.

BACKGROUND TO THE INVENTION, PROBLEM DEFINITION AND PRIOR ART

Guidable projectiles use different forms of systems for measuring and/or calculating their current position and systems for guiding the projectile towards the target of the projectile. A collective name for these systems is GNC systems, in which GNC stands for Guidance, Navigation and Control. Knowledge of current position, with maximum possible accuracy, is relevant for calculating how the projectile must be guided in order to reach its target. In modern projectiles, one part of the GNC system is a navigation system. The navigation system often consists of a GPS receiver and an INS unit. INS, which stands for Inertial Navigation System, uses an IMU unit as sensor for measuring the dynamic change. The IMU unit, in which IMU stands for Inertial Measurement Unit, measures the accelerations and angular velocities of the projectile. In most cases, the IMU unit is constructed with three gyrsoscopes and three accelerometers. The IMU unit uses dead reckoning for position determination, that is to say that the change in position is calculated on the basis of velocity, direction of travel and time. The INS unit uses sensor data from the IMU unit to calculate the position, velocity vector and orientation of the projectile.

The GPS receiver receives positioning information from a number of GPS satellites and, on the basis of this information, calculates a position and velocity. By combining and calculating information from the GPS receiver and the IMU unit, it is possible to determine current position and velocity with high accuracy. The position and velocity of the projectile can be calculated with the GPS receiver and/or information from the IMU unit. The change in attitude and angling of the projectile, termed yaw, pitch and roll, is measured with the gyroscopes belonging to the IMU unit.

Previously known solutions can be found, for example, in U.S. Pat. No. 6,163,021 A, which describes a sensor system for rotating objects in a magnetic field, in which the sensor system provides navigation information relative to a known position. The sensor system comprises magnetic sensors and uses the earth's magnetic field as reference for calculating the rotation of the projectile. The use of the earth's magnetic field limits how the projectile can be oriented relative to the magnetic field, which results in functionality limitations for the projectile.

An example of another previously known solution can be found in U.S. Pat. No. 6,779,752 B1, which describes a guidance system without any gyroscope. The described system uses three accelerometers and a GPS receiver. One problem with the described system is that no or limited information is obtained concerning the roll angle, which means that the navigation system does not give a complete or correct position determination.

A problem with currently existing solutions according to the above-stated document U.S. Pat. No. 6,163,021 A is that a rotating projectile for determination of roll angle is assumed. A problem with currently existing solutions according to the above-stated document U.S. Pat. No. 6,779,752 B1 is that the described navigation system does not give a complete or correct position determination.

Further problems which the invention intends to solve will emerge in connection with the following detailed description of the various embodiments.

OBJECT OF THE INVENTION AND ITS DISTINGUISHING FEATURES

The present invention accurately provides roll angle information for a projectile on the basis of a fewer number of sensors than conventional systems.

The present invention is constituted by a method for determining the roll angle of a guidable and substantially or partially roll-stable projectile comprising control system, radio-based positioning receiver, and sensor for measuring roll angular velocity, in which the following steps are included:

(a) actuation of the actuators of the projectile by the control system, incorporated in the projectile, for maneuvering of the projectile;

(b) estimation of a first signal, the projectile control force, on the basis of the control system incorporated in the projectile;

(c) measurement of a second signal, the velocity of the projectile relative to the ground-fixed coordinate system, with the radio-based positioning receiver mounted in the projectile;

(d) measurement of a third signal, the rotational velocity, with the sensor for roll angular velocity mounted in the projectile;

(e) calculation of a roll angle on the basis of the first, second and third signals, estimated projectile control force, measured projectile velocity, and measured rotational velocity, by summation of the absolute angle change with weighting of an angle evaluation.

According to further aspects of the improved method for roll angle determination according to the invention:

the absolute angle change is set to correspond to the resultant angle of the change in pitch angle of the projectile velocity vector and the change in yaw angle of the projectile velocity vector;

the angle evaluation is perceived as a mean value of the angle of incidence evaluation;

the angle evaluation is perceived as a mean value of the angle of the control force angle evaluation;

the mean value of the angle of incidence evaluation is assumed to correspond to the mean value of the resultant angle of the projectile control force which controls the yaw component, $\beta$ of the angle of incidence and the projectile control force which controls the pitch component, $\alpha$, of the angle of incidence;

the mean value of the control force angle evaluation is assumed to correspond to the mean value of the resultant angle of the projectile control force which controls the yaw component of the velocity vector and the projectile control force which controls the pitch component of the velocity vector;

calculation is made with filtering;

the sensor for measuring roll angular velocity is a gyroscope;

the radio-based positioning receiver is a GPS receiver;

pitch angle, $\theta$, is calculated by summation of the resultant of the projectile velocity components measured by the radio-based positioning system and evaluation of the projectile control force which controls the pitch component, $\alpha$, of the angle of incidence;

pitch angle, $\theta$, is calculated by summation of the resultant of the projectile velocity components measured by the radio-based positioning system and evaluation of the projectile control force which controls the pitch component of the velocity vector;

yaw angle, $\psi$, is calculated by subtraction of the evaluation of the projectile control force which controls the yaw component, $\beta$, of the angle of incidence from the resultant of the projectile velocity components measured by the radio-based positioning system;

yaw angle, $\psi$, is calculated by subtraction of the evaluation of the projectile control force which controls the yaw component of the velocity vector from the resultant of the projectile velocity components measured by the radio-based positioning system.

The invention additionally relates to a GNC system for a guidable projectile comprising control system, radio-based positioning system and sensor for measuring roll angular velocity for determination of roll angle, in which;

(a) the incorporated control system for maneuvering of the projectile is arranged to actuate the actuators of the projectile;

(b) the control system included in the projectile is arranged to estimate a first signal, projectile control force;

(c) the radio-based positioning receiver mounted in the projectile measures a second signal, the velocity of the projectile relative to the ground-fixed coordinate system;

(d) the sensor for roll angular velocity mounted in the projectile measures a third signal, rotational velocity;

(e) the first, second and third signals, estimated projectile control force, measured projectile velocity and measured rotational velocity, together calculate a roll angle by summation of the absolute angle change with weighting of an angle evaluation.

According to further aspects of the improved GNC system for a guidable projectile according to the invention:

the absolute angle change is set to correspond to the resultant angle of the change in pitch angle of the projectile velocity vector and the change in yaw angle of the projectile velocity vector;

the angle evaluation is perceived as a mean value of the angle of incidence evaluation;

the angle evaluation is perceived as a mean value of the angle of the control force angle evaluation;

the mean value of the angle of incidence evaluation is assumed to correspond to the mean value of the resultant angle of the projectile control force which controls the yaw component, $\beta$, of the angle of incidence and the projectile control force which controls the pitch component, $\alpha$, of the angle of incidence;

the mean value of the control force angle evaluation is assumed to correspond to the mean value of the resultant angle of the projectile control force which controls the yaw component of the velocity vector and the projectile control force which controls the pitch component of the velocity vector;

calculation is made with filtering;

the sensor for measuring roll angular velocity is a gyroscope;

the radio-based positioning receiver is a GPS receiver;

pitch angle, $\theta$, is calculated by summation of the resultant of the projectile velocity components measured by the radio-based positioning system and evaluation of the projectile control force which controls the pitch component, $\alpha$, of the angle of incidence;

pitch angle, $\theta$, is calculated by summation of the resultant of the projectile velocity components measured by the radio-based positioning system and evaluation of the projectile control force which controls the pitch component of the velocity vector;

yaw angle, $\psi$, is calculated by subtraction of the evaluation of the projectile control force which controls the yaw component, $\beta$, of the angle of incidence from the resultant of the projectile velocity components measured by the radio-based positioning system;

yaw angle, $\psi$, is calculated by subtraction of the evaluation of the projectile control force which controls the yaw component of the velocity vector from the resultant of the projectile velocity components measured by the radio-based positioning system.

Advantages and Effects of the Invention

On the basis of the proposed method, information from a GPS receiver, a roll gyro and an evaluation of angle of incidence are used to calculate the roll angle. Roll, pitch and yaw angle, together with a GPS receiver, provide a complete sensor information for a GNC system. It is thus possible to design a complete GNC system using only one gyroscope, which results in cost savings and simplified design, reduced physical size of the navigation system, and also a more robust system compared with a conventional GNC system having three gyroscopes. In an alternative solution, information from a GPS receiver, a roll gyro, and the control force acting on the control device can be used to calculate the roll angle.

LIST OF FIGURES

The invention will be described in greater detail below with reference to the appended figures, in which.

DETAILED DESCRIPTION OF EMBODIMENTS

Figure 1:
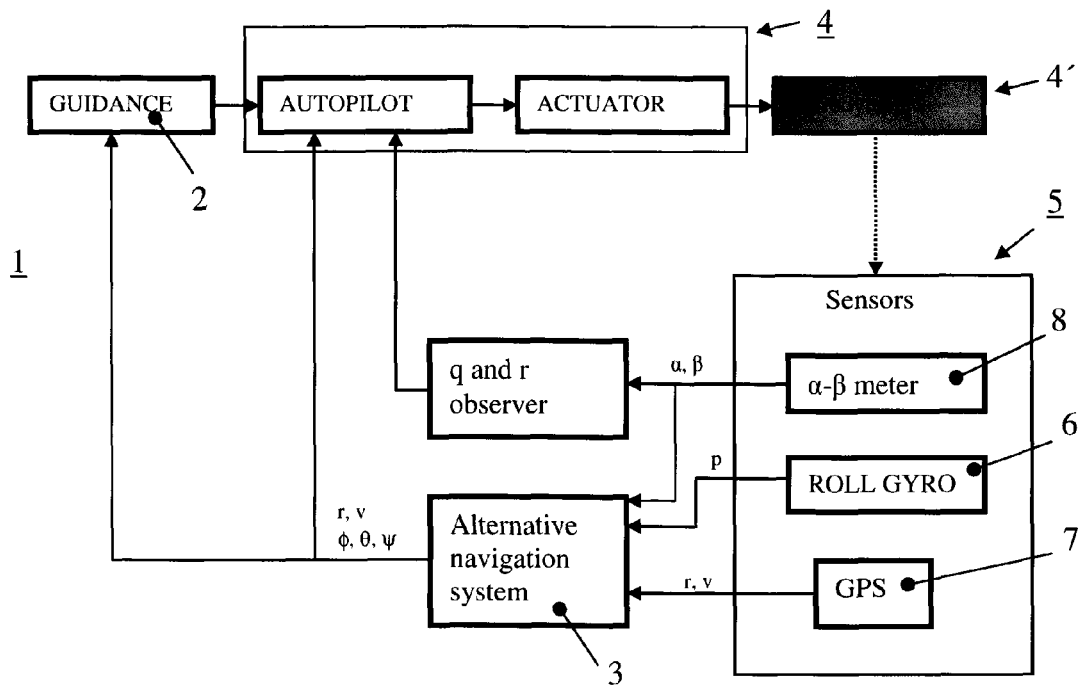
FIG. 1 shows a block diagram for calculating the roll angle in a first embodiment, where the angle of incidence is evaluated on the basis of the projectile control force which controls the pitch component of the angle of incidence or the projectile control force which controls the yaw component of the angle of incidence, according to the invention.

In FIG. 1 is shown a block diagram illustrating a reduced GNC system 1 comprising a guidance system 2, a navigation system 3 and a control system 4. The control system 4 controls control members in the form of fins or canards. Aerodynamics 4' acting on the projectile affect the projectile in terms of the path of the projectile. Changes to the projectile affect the information from sensors 5, such as, for example, roll gyro 6, GPS receiver 7 and angle of incidence meter, denoted as an α-β-meter 8. Measured information from the sensors 5 is input data for calculation of roll angle.

Figure 2:
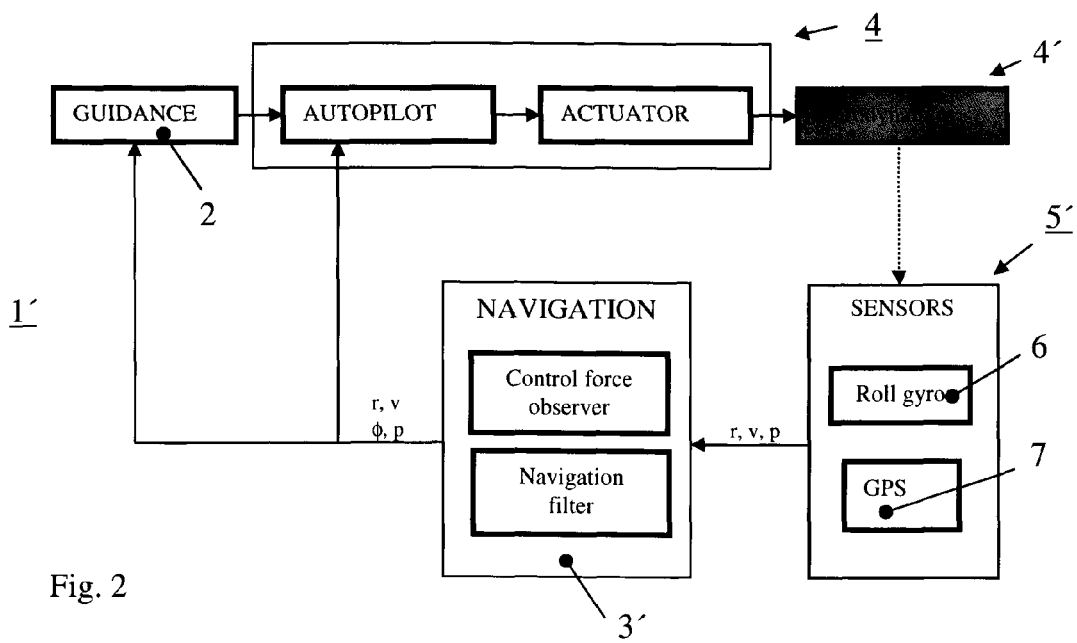
FIG. 2 shows a block diagram for calculating the roll angle in a second embodiment, where the direction and size of the control force are evaluated on the basis of the pitch component of the velocity vector or the yaw component of the velocity vector, according to the invention.

In FIG. 2 is shown a block diagram illustrating a reduced GNC system 1' comprising a guidance system 2, a navigation system 3' and a control system 4. The control system 4 controls control members in the form of fins or canards. Aerodynamics 4' acting on the projectile affect the projectile in terms of the path of the projectile. Changes to the projectile affect the information from sensors 5', such as, for example, roll gyro 6 and GPS receiver 7. Measured information from the sensors 5 is input data for calculation of roll angle.

Figure 3:
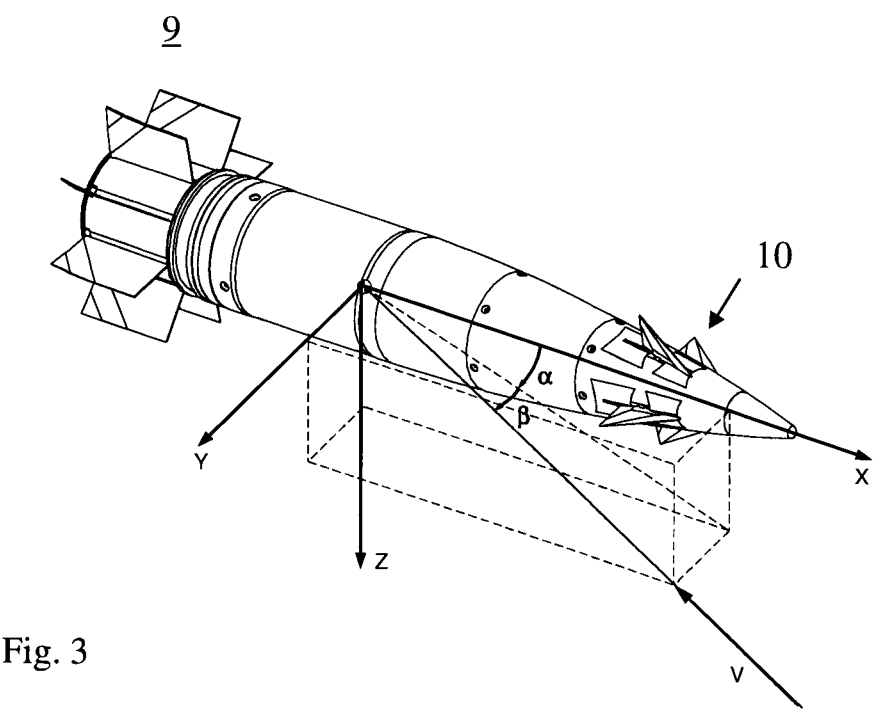
FIG. 3 shows a projectile constructed with roll angle determination according to the invention.

In FIG. 3 is shown a figure illustrating a guidable projectile 9 constructed with a GNC system comprising roll angle determination according to the invention. In the figure are shown a, for the projectile, body-fixed coordinate system X, Y and Z, a velocity vector V, as well as the angles of incidence α and β, in which α symbolizes the pitch component of the angle of incidence and β symbolizes the yaw component of the angle of incidence. The pitch component for the angle of incidence is thus the change in the plane which is spanned by the X-axis and the Z-axis, and the yaw component for the angle of incidence is the change in the plane which is spanned by the X-axis and the Y-axis and in which the plane has been angled along the Y-axis by the angle α. In the figure, the fins of the projectile are shown in the form of canard fins 10.

By measuring roll, yaw and pitch, as well as current coordinates, with a radio-based positioning system, a complete GNC system in a first embodiment shown in FIG. 1 is obtained. The radio-based positioning receiver, which can be a GPS receiver 7, a receiver for radar guidance, or other radio-based positioning equipment, is constructed to receive positioning information and thus also to be able to calculate velocity information. Roll angular velocity can be measured with a gyroscope 6, preferably a so-called rate gyro, which measures roll angular velocity. Roll angular velocity can also be measured with a magnetometer or otherwise. Angle of incidence is measured with or evaluated with an α-β-meter 8 incorporated in the projectile. The angles of incidence are denoted as α and β, in which α symbolizes the pitch component of the angle of incidence and β symbolizes the yaw component of the angle of incidence, shown in FIG. 3.

The GNC system 1 mounted in the projectile, in which GNC stands for Guidance, Navigation and Control, measures current measurement values from sensors, calculates and predicts the path for reaching a target, and controls and regulates the controllers or actuators, and thus the control members, with which the projectile is equipped. The navigation system 3 (Navigation) provides the control system 4 with information on the current position and velocity of the projectile. The guidance system 2 determines and calculates a preferred route to the target, and thus desired change with respect to velocity, rotation and/or acceleration in order to follow the calculated route to the target. The control system 4 (Control) controls and regulates the forces which control the projectile, the forces are executed with, for example, actuators, motors or servos, which, in turn, move or otherwise act upon control members in the form of fins/control surfaces or control canards 10 for controlling the projectile on the basis of the route to the target which has been calculated by the guidance system 2. The control system 4 is also responsible for keeping the projectile stable during its path from launcher to target.

The projectile is equipped with canards/fins 10 or other control members for controlling the projectile in the path of the projectile between launcher and target. When the projectile is controlled to change course, the change in the velocity vector V in relation to a predicted ballistic path is measured.

The changes are fed back in a control algorithm and compared with the desired value of the control signals for modulation of the angle of incidence. Change with respect to the velocity vector V is measured with a sensor for roll angular velocity, which measures rotational velocity, and the radio-based positioning system, which gives velocity relative to the ground-fixed coordinate system.

With input data comprising roll velocity, change in velocity relative to the ground-fixed coordinate system, and predicted change in angle of incidence, the roll angle is able to be calculated. Calculation is preferably made with different forms of filter functions. The calculation is made in the navigation system 3 of the projectile. The result is that a complete GNC system is attained by virtue of the fact that roll angle, pitch angle and also yaw angle can be calculated, and that position and velocity, on the basis of the ground-fixed coordinate system, can be measured with the radio-based positioning system.

Calculation of pitch angle, θ, is made by summation of the resultant of the velocity components measured by the radio-based positioning system and evaluation of the projectile control force which controls the pitch component, α, of the angle of incidence, according to the relationship:

$$\theta \approx \arctan\left(\frac{-v_z}{\sqrt{v_x^2 + v_y^2}}\right) + \alpha,$$

in which $v_x$, $v_y$ and $v_z$ are the components of the velocity vector.

Calculation of yaw angle, ψ, is made by subtraction of the evaluation of the projectile control force which controls the yaw component, β, of the angle of incidence from the resultant of the velocity components measured by the radio-based positioning system, according to the relationship:

$$\psi \approx \arctan\left(\frac{v_y}{v_x}\right) - \beta,$$

in which $v_x$ and $v_y$ are the components of the velocity components.

Calculation of roll angle, φ, is made by summation of the absolute angle change for the velocity vector with weighting of the mean value of the angle of incidence evaluation. Calculation of the mean value of the angle of incidence evaluation corresponds to the mean value of the resultant angle of the projectile control force which controls the yaw component, β, of the angle of incidence and the projectile control force which controls the pitch component, α, of the angle of incidence. The absolute value of the roll angle is thus obtained by the relationship:

$$\varphi_{AbsRoll} = \varphi_{AbsVel} - \arctan\left(\frac{-(\beta[k] + \beta[k-1] + \ldots + \beta[k-n+1] + \beta[k-n])}{\alpha[k] + \alpha[k-1] + \ldots + \alpha[k-n+1] + \alpha[k-n]}\right).$$

Calculation of the absolute angle change for the velocity vector corresponds to the resultant angle of the change in pitch angle of the velocity vector and the change in yaw angle of the velocity vector, according to the relationship:

$$\varphi_{AbsVel} = \arctan\left(\frac{\psi_{DIFF}}{\theta_{DIFF}}\right).$$

Where the change in yaw angle of the velocity vector, in which k and n are time intervals, is calculated according to the relationship: $\psi_{DIFF}[k] = \psi_{Vel}[k] - \psi_{Vel}[k-n]$.

Where the change in yaw angle of the velocity vector, $\psi_{Vel}$, is calculated according to the relationship:

$$\psi_{Vel} = \arctan\left(\frac{v_y}{v_x}\right),$$

in which $v_x$ and $v_y$ are the components of the velocity vector.

And where the change in pitch angle of the velocity vector is calculated in the same way as the change in yaw angle, but with compensation for gravity, according to the relationship:

$$\theta_{DIFF} = \theta_{Vel}[k] - \arctan\left(\frac{-(v_z[k-n] + g \cdot n \cdot T_S)}{\sqrt{v_x[k-n]^2 + v_y[k-n]^2}}\right)$$

in which $v_x$, $v_y$, and $v_z$ are the components of the velocity vector, g is gravity, k and n are time intervals and $T_s$ is sample time.

Where the pitch angle, $\theta_{Vel}$, of the velocity vector is calculated according to the relationship:

$$\theta_{Vel} = \arctan\left(\frac{-v_z}{\sqrt{v_x^2 + v_y^2}}\right),$$

in which $v_x$, $x_y$, and $v_z$ are the components of the velocity vector.

The calculations are preferably carried out with filter functions, but also in other suitable ways, including tables (look-up table), estimations, or otherwise. Preferably, calculation is made in some form of programmable system comprising a microprocessor, signal processor or other computing electronics.

A second embodiment of a GNC system 1', for example for projectiles which generate control forces without creation of an angle of incidence, is shown in FIG. 2. In the second embodiment of the GNC system 1', roll angle can be determined on the basis of the pitch component of the velocity vector or the yaw component of the velocity vector. With input data comprising roll velocity, change in velocity relative to the ground-fixed coordinate system, as well as yaw component of the velocity vector and pitch component of the velocity vector, the roll angle is able to be calculated. Calculation is preferably made with different forms of filter functions. The calculation is made in the navigation system 3' of the projectile. The result is that a complete GNC system is attained by virtue of the fact that roll angle, pitch angle and also yaw angle can be calculated, and that position and velocity, on the basis of the ground-fixed coordinate system, can be measured with the radio-based positioning system.

An example of a projectile with GNC system, applying a method for roll angle determination, is a roll-stabilized 155 mm artillery shell provided with four control canards, a GPS receiver, angle of incidence determination, and a gyro for measuring roll angle.

Alternative Embodiments

The invention is not limited to the specifically shown embodiments, but can be varied in different ways within the scope of the patent claims.

It will be appreciated, for example, that the number, size, material and shape of the elements and component parts belonging to the method for roll angle determination and to the GNC system are adapted to the system(s) and miscellaneous design characteristics which currently exist.

It will be appreciated that the above-described method for roll angle determination, and/or navigation system, can be applied, in principle, to all vehicles and systems comprising aircraft, projectiles and missiles.

What is claimed is:

1. Method for determining the roll angle of a guidable and substantially or partially roll-stable projectile comprising control system, radio-based positioning receiver and sensor for measuring roll angular velocity, which comprises the following steps:
   (a) actuation of the actuators of the projectile by the control system, included in the projectile, for maneuvering of the projectile;
   (b) estimation of a first signal, the projectile control force, on the basis of the control system included in the projectile;
   (c) measurement of a second signal, the velocity of the projectile relative to the ground-fixed coordinate system, with the radio-based positioning receiver mounted in the projectile;
   (d) measurement of a third signal, the rotational velocity, with the sensor for roll angular velocity mounted in the projectile;
   (e) calculation of a roll angle on the basis of the first, second and third signals, estimated projectile control force, measured projectile velocity and measured rotational velocity, by summation of the absolute angle change with weighting of an angle evaluation.

2. Method for roll angle determination according to claim 1, wherein the absolute angle change is set to correspond to the resultant angle of the change in pitch angle of the projectile velocity vector and the change in yaw angle of the projectile velocity vector.

3. Method for roll angle determination according to claim 1, wherein the angle evaluation is perceived as a mean value of the angle of incidence evaluation.

4. Method for roll angle determination according to claim 3, wherein the mean value of the angle of incidence evaluation is assumed to correspond to the mean value of the resultant angle of the projectile control force which controls the yaw component, β, of the angle of incidence and the projectile control force which controls the pitch component, α, of the angle of incidence.

5. Method for roll angle determination according to claim 1, wherein the angle evaluation is perceived as a mean value of the angle of the control force angle evaluation.

6. Method for roll angle determination according to claim 5, wherein the mean value of the control force angle evaluation is assumed to correspond to the mean value of the resultant angle of the projectile control force which controls the yaw component of the velocity vector and the projectile control force which controls the pitch component of the velocity vector.

7. Method for roll angle determination according to claim 1, wherein calculation is made with filtering.

8. Method for roll angle determination according to claim 1, wherein the sensor for measuring roll angular velocity is a gyroscope.

9. Method for roll angle determination according to claim 1, wherein the radio-based positioning receiver is a GPS receiver.

10. Method for roll angle determination according to claim 1, wherein pitch angle, $\theta$, is calculated by summation of the resultant of the projectile velocity components measured by the radio-based positioning system and evaluation of the projectile control force which controls the pitch component, $\alpha$, of the angle of incidence.

11. Method for roll angle determination according to claim 1, wherein pitch angle, $\theta$, is calculated by summation of the resultant of the projectile velocity components measured by the radio-based positioning system and evaluation of the projectile control force which controls the pitch component of the velocity vector.

12. Method for roll angle determination according to claim 1, wherein yaw angle, $\psi$, is calculated by subtraction of the evaluation of the projectile control force which controls the yaw component, $\beta$, of the angle of incidence from the resultant of the projectile velocity components measured by the radio-based positioning system.

13. Method for roll angle determination according to claim 1, wherein yaw angle, $\psi$, is calculated by subtraction of the evaluation of the projectile control force which controls the yaw component of the velocity vector from the resultant of the projectile velocity components measured by the radio-based positioning system.

14. GNC system for a guidable projectile comprising control system, radio-based positioning system and sensor for measuring roll angular velocity for determination of roll angle, wherein;
  (a) the incorporated control system for maneuvering of the projectile is arranged to actuate the actuators of the projectile;
  (b) the control system included in the projectile is arranged to estimate a first signal, projectile control force;
  (c) the radio-based positioning receiver mounted in the projectile measures a second signal, the velocity of the projectile relative to the ground-fixed coordinate system;
  (d) the sensor for roll angular velocity mounted in the projectile measures a third signal, rotational velocity;
  (e) the first, second and third signals, estimated projectile control force, measured projectile velocity and measured rotational velocity, together calculate a roll angle, in the GNC system, by summation of the absolute angle change with weighting of an angle evaluation.

15. GNC system for guidable projectile according to claim 14, wherein the absolute angle change is set to correspond to the resultant angle of the change in pitch angle of the projectile velocity vector and the change in yaw angle of the projectile velocity vector.

16. GNC system for guidable projectile according to claim 14, wherein the angle evaluation is perceived as a mean value of the angle of incidence evaluation.

17. GNC system for guidable projectile according to claim 16, wherein the mean value of the angle of incidence evaluation is assumed to correspond to the mean value of the resultant angle of the projectile control force which controls the yaw component, $\beta$, of the angle of incidence and the projectile control force which controls the pitch component, $\alpha$, of the angle of incidence.

18. GNC system for guidable projectile according to claim 14, wherein the angle evaluation is perceived as a mean value of the angle of the control force angle evaluation.

19. GNC system for guidable projectile according to claim 18, wherein the mean value of the control force angle evaluation is assumed to correspond to the mean value of the resultant angle of the projectile control force which controls the yaw component of the velocity vector and the projectile control force which controls the pitch component of the velocity vector.

20. GNC system for guidable projectile according to claim 14 calculation is made with filtering.

21. GNC system for guidable projectile according to claim 14, wherein the sensor for measuring roll angular velocity is a gyroscope.

22. GNC system for guidable projectile according to claim 14, wherein the radio-based positioning receiver is a GPS receiver.

23. GNC system for guidable projectile according to claim 14, wherein pitch angle, $\theta$, is calculated by summation of the resultant of the projectile velocity components measured by the radio-based positioning system and evaluation of the projectile control force which controls the pitch component, $\alpha$, of the angle of incidence.

24. GNC system for guidable projectile according to claim 14, wherein pitch angle, $\theta$, is calculated by summation of the resultant of the projectile velocity components measured by the radio-based positioning system and evaluation of the projectile control force which controls the pitch component of the velocity vector.

25. GNC system for guidable projectile according to claim 14, wherein yaw angle, $\psi$, is calculated by subtraction of the evaluation of the projectile control force which controls the yaw component, $\beta$, of the angle of incidence from the resultant of the projectile velocity components measured by the radio-based positioning system.

26. GNC system for guidable projectile according to claim 14, wherein yaw angle, $\psi$, is calculated by subtraction of the evaluation of the projectile control force which controls the yaw component of the velocity vector from the resultant of the projectile velocity components measured by the radio-based positioning system.

* * * * *